Dec. 14, 1971    R. W. EBELING, JR    3,626,671
ADSORBER ELEMENT AND TEMPERATURE CONTROLLED
ADSORBER PURIFICATION SYSTEM
Filed May 2, 1969    2 Sheets-Sheet 1

Dec. 14, 1971   R. W. EBELING, JR   3,626,671
ADSORBER ELEMENT AND TEMPERATURE CONTROLLED
ADSORBER PURIFICATION SYSTEM
Filed May 2, 1969                     2 Sheets-Sheet 2
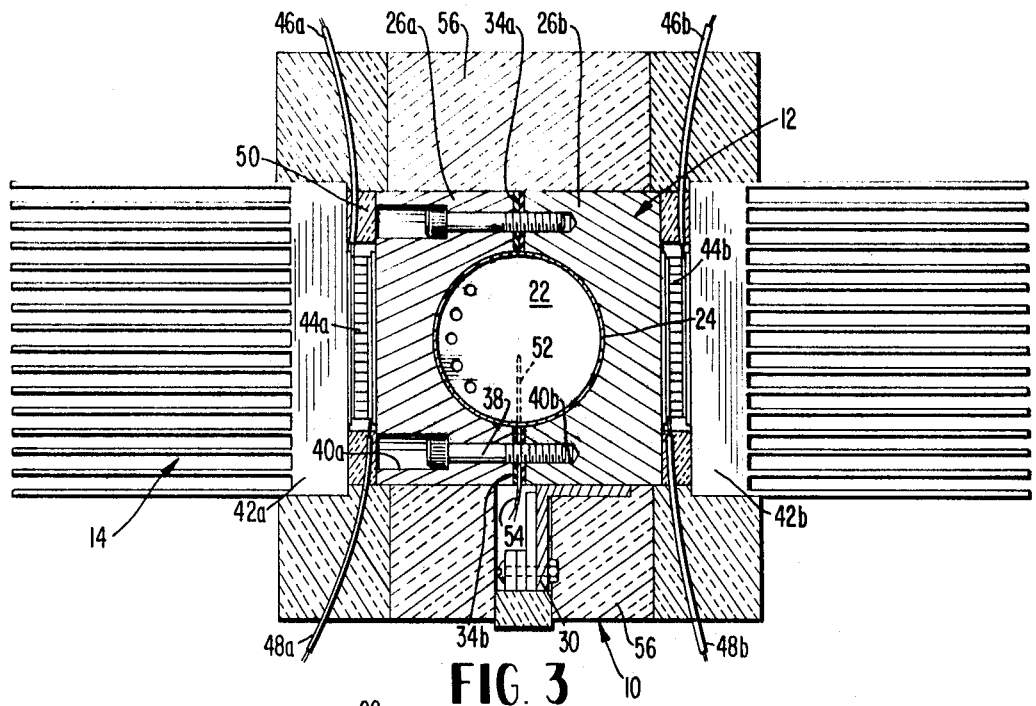
FIG. 3
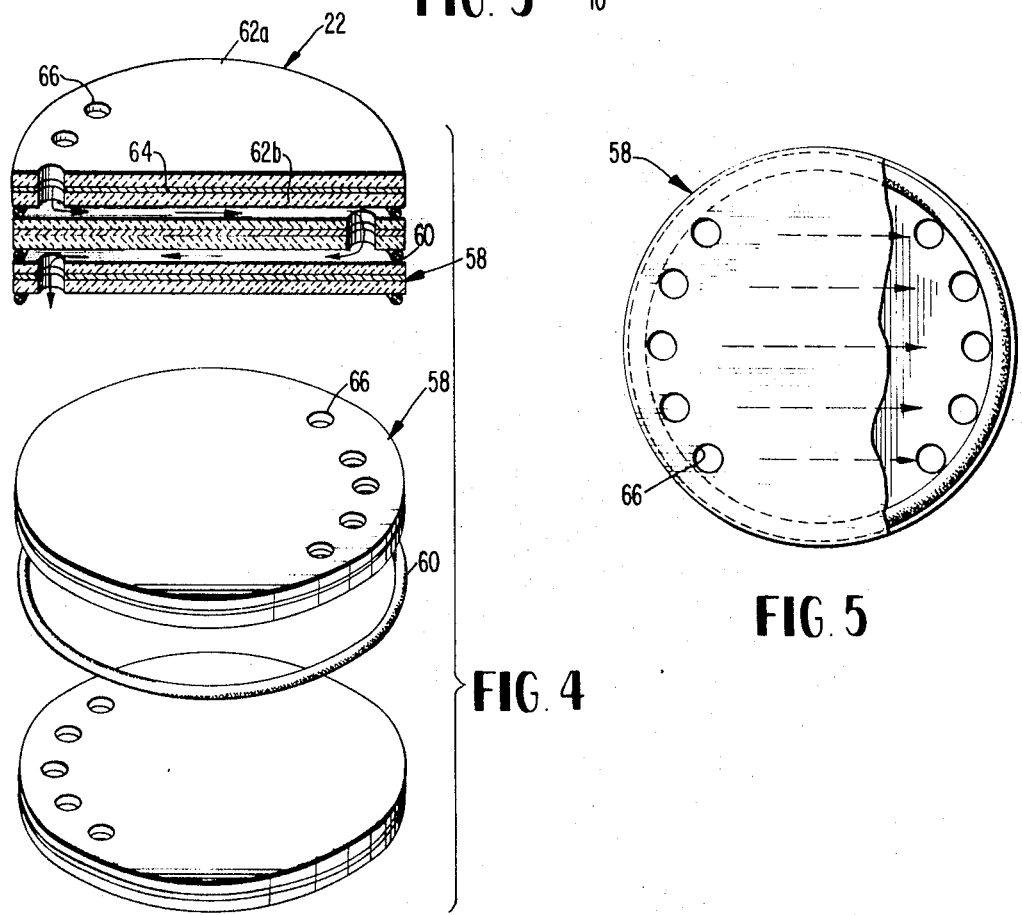
FIG. 4
FIG. 5

United States Patent Office 3,626,671
Patented Dec. 14, 1971

3,626,671
ADSORBER ELEMENT AND TEMPERATURE CONTROLLED ADSORBER PURIFICATION SYSTEM
Robert W. Ebeling, Jr., Maxatawny, Pa., assignor to Air Products and Chemicals, Inc., Allentown, Pa.
Filed May 2, 1969, Ser. No. 821,182
Int. Cl. B01d 53/00
U.S. Cl. 55—179
8 Claims

ABSTRACT OF THE DISCLOSURE

A gas purification system of the adsorption type is disclosed wherein the adsorption bed comprises a plurality of adsorbent elements disposed in spaced relationship to one another with channeling provided to conduct gas between the elements. Thermoelectric elements, in heat transmitting contact with each of the adsorbent elements, remove heat therefrom to cool the bed during the adsorption cycle and introduce heat thereto during regeneration.

BACKGROUND OF THE INVENTION

Gas purifying adsorption systems are well known in the art. In such systems, the adsorptivity of adsorbents such as silica gel, alumina, activated carbon and molecular sieves is utilized to remove impurities from gas which passes in contact therewith. The adsorptivity characteristics of such adsorbents, however, decrease substantially with increasing temperature.

In conventional packed bed adsorbers, the energy released during adsorption causes a rise in bed temperature if the adsorbate is present in larger than trace concentrations. Such increase in temperature lowers the adsorptive capacity of the bed.

It has been common practice in the prior art, to provide external systems of the fluid type to furnish both cooling of the adsorbent during the purification cycle as well as to supply heat to the adsorbent during the regeneration cycle. External refrigeration and heating systems, however, add significantly to the weight and complexity of the adsorption unit. Furthermore, external temperature control systems are relatively inefficient since the inherently low thermoconductivity of packed bed adsorbers makes removal of heat generated during the purification cycle difficult. In addition, precise temperature control in such systems is extremely difficult due to the relatively high mass of the adsorbent and the attendant time delay in heating and cooling the adsorbent during each cycle of purification and regeneration.

In order to overcome the disadvantages of the prior art, it has been proposed that purification systems utilizing adsorbent beds be provided with an internal heat flow arrangement, which arrangement is intimately in contact with the interior portions of the bed to thereby provide more efficient heating and cooling thereof. It has also been proposed that a heat flow device of reduced weight and size be provided for adsorbent beds by utilizing thermolelectric or Peltier heat pumps to provide the required heating and cooling.

The use of a Peltier device provides further advantages in that regenerative adsorption systems previously proposed have required separate adsorbent cooling and heating devices for adsorption and desorption. With a Peltier device, the pump can be utilized either for thermoelectric cooling or thermoelectric heating by reversing the direction of electric current through the device. The thermoelectric devices furthermore are compact, lightweight, do not have any moving parts and do not require compressors.

In the systems thus far proposed, the heat of adsorption is not generally dissipated as rapidly as it is produced and, therefore the adsorbent's temperature is increased and its adsorptive capacity is accordingly decreased thereby necessitating a greater quantity of adsorbent than theoretically required. In addition, due to the poor thermal conductivity of the adsorbent in the packed bed configuration, such adsorbers require excessive power for rapid adsorption and regeneration.

OBJECTS AND ADVANTAGES OF THE PRESENT INVENTION

The present invention relates to a novel adsorber element and an adsorption gas purification system of the thermoelectric type using such elements and more particularly to a new and improved system which combines the advantages of thermoelectric cooling and heating of adsorbent beds with a thin plate adsorbent element configuration which increases the efficiency of heat transfer to the bed and simplifies the fabrication and assembly thereof.

This invention provides a thermoelectric adsorption system having improved heat and mass transfer characteristics by providing an adsorption bed configuration made up of adsorbent elements having large surface to volume ratio; a tortuous gas flow path through the adsorbent elements configured to provide turbulence at low gas velocities while, at the same time, permitting large gas flow rates at moderate pressure drops; and, improved, efficient means for removing and supplying heat directly to the adsorbent elements.

The invention also provides an adsorbent element which has maximum adsorbent porosity consistent with adequate mechanical strength and is ideally suited for economy of fabrication and ease of assembly.

In a preferred embodiment, the invention comprises an adsorption column including a plurality of flat adsorbent tablet members composed of a pair of adsorbent wafer shaped elements sandwiching a heat conducting plate element therebetween; gas transmitting passages asymmetrically formed through the tablet members; the tablet members being disposed in axial, spaced alignment with succeeding tablet members being axially rotated 180° with respect to one another to thereby provide a tortuous gas passage through and between the tablet members; thermoelectric heat pump means disposed adjacent the tablet members in heat transmitting relation with each heat conducting plate element in such a manner that the heat flow generated by the pump means is transmitted through the heat conducting plate element of each adsorbent tablet member. The wafer and plate elements may be circular or of any other desirable shape.

These and other objects of the invention will become better understood to those skilled in the art by reference to the following detailed description when viewed in light of the accompanying drawings wherein like components throughout the figures thereof are indicated by like numerals and wherein:

BRIEF DESCRIPTION OF THE DRAWINGS

FIG. 3 is an enlarged transverse sectional view of the column of FIG. 1 encased in insulating structure;

FIG. 4 is an exploded and enlarged perspective view, partly in section, of a stack of absorbent elements of the unit of FIG. 2; and FIG. 5 is a plan view, partly broken away, of the stack of FIG. 4.

DETAILED DESCRIPTION

Although this invention may be applied to removal of impurities from any gas, the invention as specifically described hereinafter, is applied for purposes of illustration to the removal of $CO_2$ from breathing atmospheres. From the standpoint of capacity and selectivity, it has been found that synthetic zeolites or "molecular sieves" are best suited for $CO_2$ adsorption.

Figure 1:
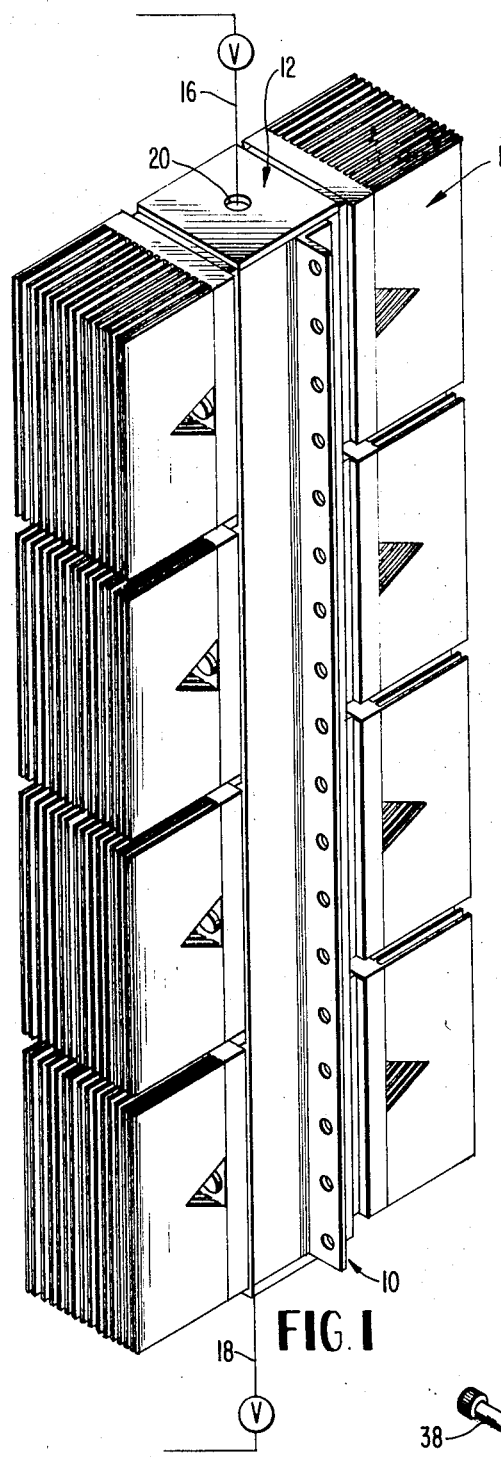
FIG. 1 is a perspective view of a thermoelectric adsorption column in accordance with the invention.

Turning now to FIG. 1 of the drawings, 10 generally indicates an adsorption column, comprising an adsorption unit, indicated generally at 12, having a plurality of thermoelectric heat pump elements, indicated generally at 14, disposed on either side thereof. Conduiting means with appropriate valving indicated schematically at 16 and 18 serve to conduct gas to and from opposite ends of the adsorption column 10 respectively through an opening 20 in the top of the unit 12 and a corresponding similar opening in the bottom (not shown).

Figure 2:
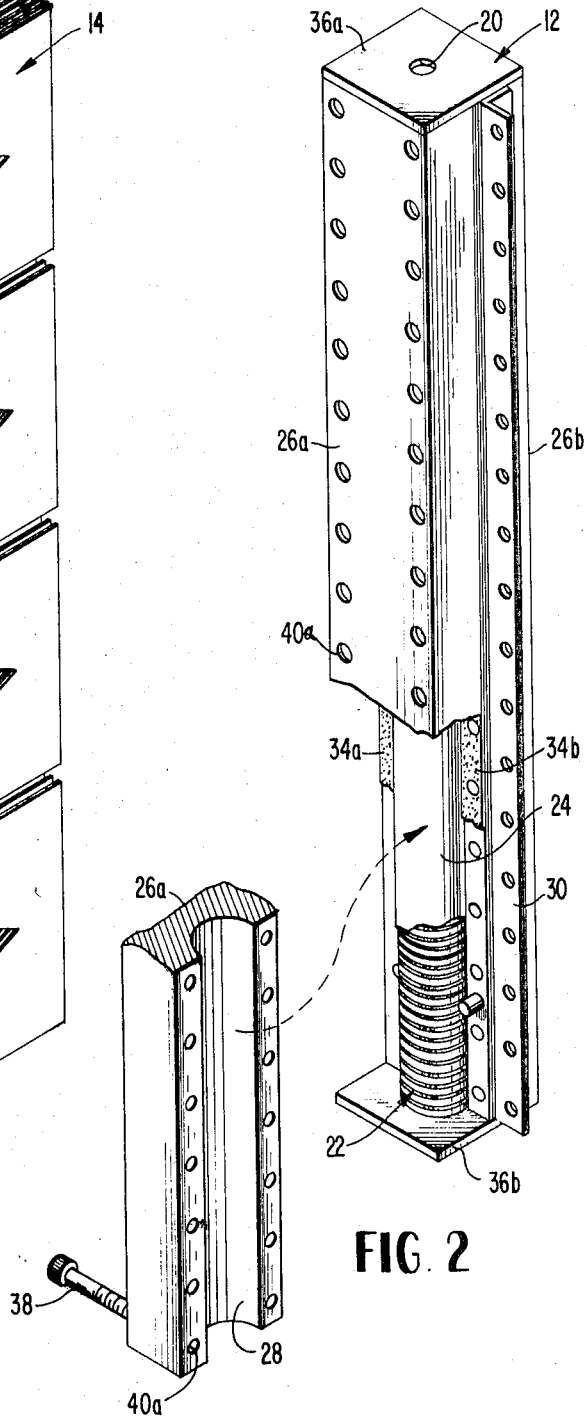
FIG. 2 is a perspective view, partly broken away, of the adsorption unit of the column of FIG. 1.

In FIG. 2, the adsorption unit 12 is shown with the heat pump elements 14 removed. The unit comprises an axially aligned stack of adsorbent elements, generally indicated at 22, surrounded by a foil tube 24 of heat transmitting material. The foil tube 24 preferably is fabricated from a sheet of relatively malleable metal such, for example, as lead foil or the like. A bifurcated, elongated heat conducting housing comprising a pair of members 26a and 26b having longitudinally disposed semicircular channels 28 formed in the mating surfaces thereof, encloses the foil tube 24 and stack 22. A flange 30 is connected to one side of the member 26b to serve as a point for mechanical support of the column. Gaskets 34a and 34b, formed of silicone rubber or the like, are disposed between the mating surfaces of the heat conducting members 26a and 26b to provide a seal. End plates 36a and 36b, attached over the ends of the heat conducting members 26a and 26b, form the ends of the adsorption unit 12. Assembly of the aforedescribed elements may be accomplished in any suitable manner such, for example, as by means of bolts 38 disposed through bores 40a and 40b (FIG. 3) formed in the heat conducting members 26a and 26b.

Referring now to FIG. 3 of the drawings, the thermoelectric heat pump units 14 comprise heat dissipation elements 42a and 42b, each unit including a heat sink combined with heat transfer fins. Thermoelectric elements 44a and 44b are disposed between the heat dissipating elements 42a and 42b and the heat conducting members 26a and 26b respectively. The elements 44a and 44b are connected by leads 46a, 46b and 48a and 48b to a source of electric power (not shown). The term "thermoelectric element," as used herein, refers to a known device composed of dissimilar metals which, when supplied with electric current, produces a temperature gradient causing reversible Peltier heating and cooling at the opposite ends thereof. The "ends" referred to above correspond to the surfaces of the thermoelectric elements 44a and 44b abutting the heat dissipating elements 42a and 42b and the heat conducting members 26a and 26b respectively. Upon imposition of electric current to the thermoelectric elements 44a and 44b, heat flows between the heat dissipating elements 42a and 42b and the heat conducting members 26a and 26b respectively in a direction depending upon the polarity of current applied to the thermolectric elements.

The heat dissipating elements 42a and 42b are supported in spaced relationship to the heat conducting members 26a and 26b respectively by insulating blocks 50. A thermocouple 52, interposed in the stack of adsorbent elements 22, is connected by a lead 54 to a temperature sensing device (not shown) to provide means to monitor the temperature within the adsorption unit 12. A series of insulating bats 56, composed of foamed polyurethane or the like, surround the adsorption column 10 to provide insulation from the ambient air.

Referring now to FIGS. 4 and 5 of the drawings, the stack 22 of adsorbent members is composed of a plurality of adsorbent tablets shown generally at 58, disposed in spaced relationship to one another. Annular elastomeric rings 60, preferably formed of an elastomer such as silicone rubber or the like, are interposed between the opposed faces of tablets 58 to provide spacing therebetween and to seal the area enclosed thereby. Each tablet 58 comprises a pair of adsorbent plates or wafers 62a and 62b sandwiching therebetween a heat transmitting plate 64 substantially coextensive in area with the associated faces of the wafers. The wafers 62a and 62b may be composed of a molecular sieve material while the heat transmitting plate 64 is perferably composed of a metal having high heat conductivity such, for example, as aluminum or the like. Molecular sieves are hydrated alkaline metal alumino-silicates, which, when the water of hydration is driven off, comprise crystal structure forming a network of empty micropores in a manner well known in the art. The molecular sieve crystals are compacted with clay to form the adsorbent material.

In the device specifically described herein, the adsorbent wafers 62a, 62b were fabricated from 80 parts by weight of molecular sieve 13-X powder, dry blended with 20 parts of halloysite-kaolinite iron-free Avery clay. Weighed portions of the clay-sieve mixture were compressed to 15,000 lbs., 1⅛ inches in a cylindrical punch and die set and then heated to 1,160° F. for one hour under dry nitrogen purge to effect an irreversible phase change in the clay to impart added strength to the thus formed wafers. Each of the tablets 58 has formed therethrough a plurality of gas transmitting passageways 66 asymmetrically disposed (relative to the principle transverse axis of the tablet) proximate the periphery of one side thereof. These passages are shown in the form of a plurality of bores through the tablet but obviously a marginal portion or portions of the tablet could be omitted instead to form a single or multiple passage through the tablet between the tablet and tube 24 along a minor portion of the edge of the tablet. As illustrated in FIGS. 4 and 5, each successive tablet is rotated 180° with respect to the preceding tablet so that the passageways 66 of each tablet are oppositely disposed with respect to one another thereby providing a tortuous path through the stack 22 as is illustrated by the arrows in the figures.

In assembly, the heat conducting member 26a is placed horizontally with the channel 28 facing upwardly. A precut strip of lead foil, .008 inch thick, is placed lengthwise along the head conducting member and is pressed into the channel 28 by superimposing a stack of adsorbent members 22 thereon to thereby form one-half of tube 24. The heat conducting member 26a with a similar strip of lead foil is then placed over the member 26b and the bolts are inserted and tightened to draw the members 26a and 26b together to complete tube 24. As the members are drawn together, the heat transmitting plates 64 bite into the lead foil tube 24 to establish positive thermal contact between at least the major portion of the edge of each adsorbent tablet 58 and the heat conducting members 26a and 26b. The heat pump elements 14, flange 30, end plates 36a and 36b with appropriate gasketing (not shown) and the insulating bats 56 are installed and assembly of the adsorber column 10 is completed.

As has been described above, the embodiment illustrated is particularly adapted for removal of $CO_2$ from breathing atmospheres. As illustrated, the assembled column includes eight thermoelectric elements 14. The heat pumps 44a and 44b may comprise, for example, MELCOR CPL-31.06 heat pumps made by Materials and Electronic Products Corporation, Trenton, N.J. The elements 14 are preferably cooled by forced air directed through the projecting fins of heat dissipating elements 42a and 42b to dissipate both the heat from the adsorption unit 12 and the $I^2R$ heat generated within the elements 44a and 44b by their internal electrical resistance.

In operation of the device, the conducting means 16 are connected to a source of gas flow such, for example, as an aircraft rebreather circuit or the like. A flow of gas comprising breathing atmospheres contaminated with $CO_2$ is initiated through the unit 12 and the adsorbent members or tablets 58, as shown by the arrows in FIG. 4. As the gas contacts the surfaces of the adsorbent wafers 62a, 62b, the $CO_2$ therein is adsorbed and the heat of adsorption generated thereby is transmitted to the heat transmitting plates 64.

The thermoelectric elements 44a and 44b, connected in series or in parallel with one another, are connected to a suitable source of direct current through the leads 46a and 46b and 48a and 48b. By proper selection of the polarity of the current imposed on the elements 44a and 44b, a temperature difference is established between the parallel faces of the elements and generates a heat flow as follows (with specific reference to the elements 44a in FIG. 3): heat of adsorption is transmitted from the adsorbent wafers 62a, 62b to the heat transmitting plates 64 flows from the plate 64, through the foil tube 24, through the heat conducting member 26a, through the element 44a to the fins of heat dissipating element 42a from which it is dissipated to the ambient air. In a similar manner, heat is also removed from the plates 64 in the opposite direction through the tube 24, heat conducting member 26b, element 44b, and heat dissipating element 42b.

The heat of adsorption in the unit 12 is thus continuously removed from the unit thereby permitting maintenance of relatively low temperature in the adsorbent material for efficient operation of the device.

When the concentration of $CO_2$ impurities in the adsorbent reaches a predetermined level, the column 10 is taken off stream and regenerated by desorbing the adsorbent material. Such regeneration may, for example, be accomplished with a dry gas purge. With gas supplied through the conduiting means 16 and 18, the polarity of the current applied to the elements 44 is reversed by any suitable switching means (not shown) and heat is generated as follows: heat from the ambient air, collected through the fins of the heat dissipating element 42a, flows through the element 44a, heat conducting member 26a, foil tube 24 and through the heat transmitting plates 64 into the adsorbent wafers 62a, 62b, thereby raising the temperature of the adsorbing wafers to accelerate the desorption of $CO_2$ therefrom into the purge stream flowing thereover. Heat generated by the internal resistance of the element 44a is also added to the heat flowing to the adsorbent material thereby increasing the total heat directed thereto. It has been found that the internal heat of the unit 12 may be maintained at a temperature as high as 200° F., which is suitable for the regeneration process.

After the column 10 is regenerated, as may be determined by analysis of the effluent purged gas, the device can then be returned to the rebreather circuit.

What has been set forth above is intended primarily as exemplary to enable those skilled in the art in the practice of the invention. It should therefore be understood that, within the scope of the appended claims, the invention may be practiced other than as specifically described.

What is new and therefore desired to be protected by Letters Patent of the United States is:

1. An adsorbent member for fluid stream purification systems comprising at least one adsorbent element comprising a thin, flat plate, for adsorption of impurities in fluid streams;

a heat conducting element in heat exchange relationship with the adsorbent element for transmission of heat to and from the adsorbent element; and passage means disposed through the adsorbent member for transmission of fluid to be purified through the adsorbent member;

wherein the elements comprise thin, flat plates of substantially similar shape and wherein the passage means comprise a plurality of bores disposed through the member on one side of a diametrical axis thereof.

2. A member in accordance with claim 1, wherein the heat conducting element is sandwiched between two adsorbent elements.

3. A purification system for removing impurities from a fluid stream comprising in combination:

an adsorption unit including a plurality of substantially flat adsorbent means disposed in stacked and spaced relationship to one another;

channeling means to direct a fluid stream through the unit in contact with opposed faces of the adsorbent means for adsorption of impurities in said fluid;

thermoelectric means for generating heat flow; and heat conducting means interposed between the thermoelectric means and the adsorbent means.

4. A system in accordance with claim 3 wherein each of the adsorbent means comprise a flat heat transmitting element and a flat adsorbent means disposed in extended surface contact with each opposite face of the heat transmitting element.

5. A system in accordance with claim 3 wherein the channeling means comprise:

an annular seal acting between each of the adsorbent means to provide a confined area between the opposed faces of the adsorbent means; and passageway means associated with each of the adsorbent means on one side of the principal transverse axis thereof to provide communication between the confined areas, each of adsorbent means being aligned so that the passageway means thereof are disposed 180° out of phase with the passageway means of the next adjacent of the adsorbent means to provide a tortuous flow path for gas through the adsorption unit.

6. A system in accordance with claim 3 wherein the thermoelectric means comprises at least one thermoelectric heat flow generating element disposed adjacent the adsorbent means and wherein the heat conducting means comprise a heat conducting jacket enclosing the stacked adsorbent means, the jacket being in contact with each of the heat transmitting elements and with the heat flow generating element.

7. A system in accordance with claim 3 wherein the thermoelectric means further comprises heat dissipating means.

8. A system in accordance with claim 7 wherein the heat dissipating means include a plurality of heat conducting projections in contact with and extending outwardly of said thermoelectric means and into heat transfer contact with ambient air.

References Cited

UNITED STATES PATENTS

| | | | |
|---|---|---|---|
| 2,974,747 | 3/1961 | Coolidge, Jr. et al. | 55—179 X |
| 2,975,860 | 3/1961 | Westeren | 55—179 |

REUBEN FRIEDMAN, Primary Examiner

R. W. BURKS, Assistant Examiner